United States Patent
Litke et al.

(10) Patent No.: US 12,019,897 B2
(45) Date of Patent: *Jun. 25, 2024

(54) PRE-POPULATION OF PERSISTENT STORAGE VOLUMES

(71) Applicant: Red Hat, Inc., Raleigh, NC (US)

(72) Inventors: Adam Gerard Litke, Castle Shannon, PA (US); Michael Howard Henriksen, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,109

(22) Filed: Apr. 13, 2023

(65) Prior Publication Data

US 2023/0251790 A1  Aug. 10, 2023

Related U.S. Application Data

(63) Continuation of application No. 17/246,282, filed on Apr. 30, 2021, now Pat. No. 11,630,599.

(51) Int. Cl.
*G06F 3/06* (2006.01)
*G06F 9/455* (2018.01)
*G06F 15/177* (2006.01)
*G06F 16/172* (2019.01)

(52) U.S. Cl.
CPC ............ *G06F 3/065* (2013.01); *G06F 3/0604* (2013.01); *G06F 3/0632* (2013.01); *G06F 3/0659* (2013.01); *G06F 3/067* (2013.01); *G06F 15/177* (2013.01); *G06F 16/172* (2019.01); *G06F 2009/45579* (2013.01)

(58) Field of Classification Search
CPC ...... G06F 3/065; G06F 3/0604; G06F 3/0632; G06F 3/0659; G06F 3/067; G06F 15/177; G06F 16/172; G06F 3/0662; G06F 3/0665; G06F 2009/45562; G06F 2009/45579

See application file for complete search history.

(56) References Cited

U.S. PATENT DOCUMENTS

| | | |
|---|---|---|
| 10,225,335 B2 | 3/2019 | Fu et al. |
| 10,601,917 B2 | 3/2020 | Chirammal et al. |
| 10,908,999 B2 | 2/2021 | Natanzon et al. |
| 2020/0042632 A1 | 2/2020 | Natanzon et al. |
| 2021/0011816 A1 | 1/2021 | Mitkar et al. |
| 2021/0019055 A1 | 1/2021 | Bett et al. |
| 2021/0382741 A1 | 12/2021 | Dontu et al. |

OTHER PUBLICATIONS

Perry, Y. (Oct. 20, 2020) "Kubernetes Storage: An In-Depth Look," NetApp Cloud Volumes ONTAP, pp. 18.
Joseph D. Marhee; "Getting Started with Kubernetes InitContainers and Volume pre-populatin," Jan. 21, 2019; https://dev.to/jmarhee/getting-started-with-kubernetes-initcontainers-and-volume-pre-population-j83; p. 1-4 (Year: 2019).

*Primary Examiner* — Idriss N Alrobaye
*Assistant Examiner* — Richard B Franklin
(74) *Attorney, Agent, or Firm* — Womble Bond Dickinson (US) LLP

(57) ABSTRACT

A method includes populating a physical storage volume associated with a second PVC from a data source identified by a first PVC and in response to populating the physical storage volume, associating the physical storage volume with the first PVC.

20 Claims, 6 Drawing Sheets

PRE-POPULATION OF PERSISTENT STORAGE VOLUMES

RELATED APPLICATIONS

This application is a continuation of U.S. patent application Ser. No. 17/246,282, filed on Apr. 30, 2021, which is herein incorporated by reference in its entirety.

TECHNICAL FIELD

Aspects of the present disclosure relate to persistent storage management in virtual environments, and more particularly, pre-population of persistent storage volumes in a Kubernetes™ cluster.

BACKGROUND

A container-orchestration system may be a platform for developing and running containerized applications and may allow applications and the data centers that support them to expand from just a few machines and applications to thousands of machines that serve millions of clients. Container-orchestration system may provide an image-based deployment module for creating containers and may store one or more image files for creating container instances. Many application instances can be running in containers on a single host without visibility into each other's processes, files, network, and so on. Each container may provide a single function (often called a "service") or component of an application, such as a web server or a database, though containers can be used for arbitrary workloads.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
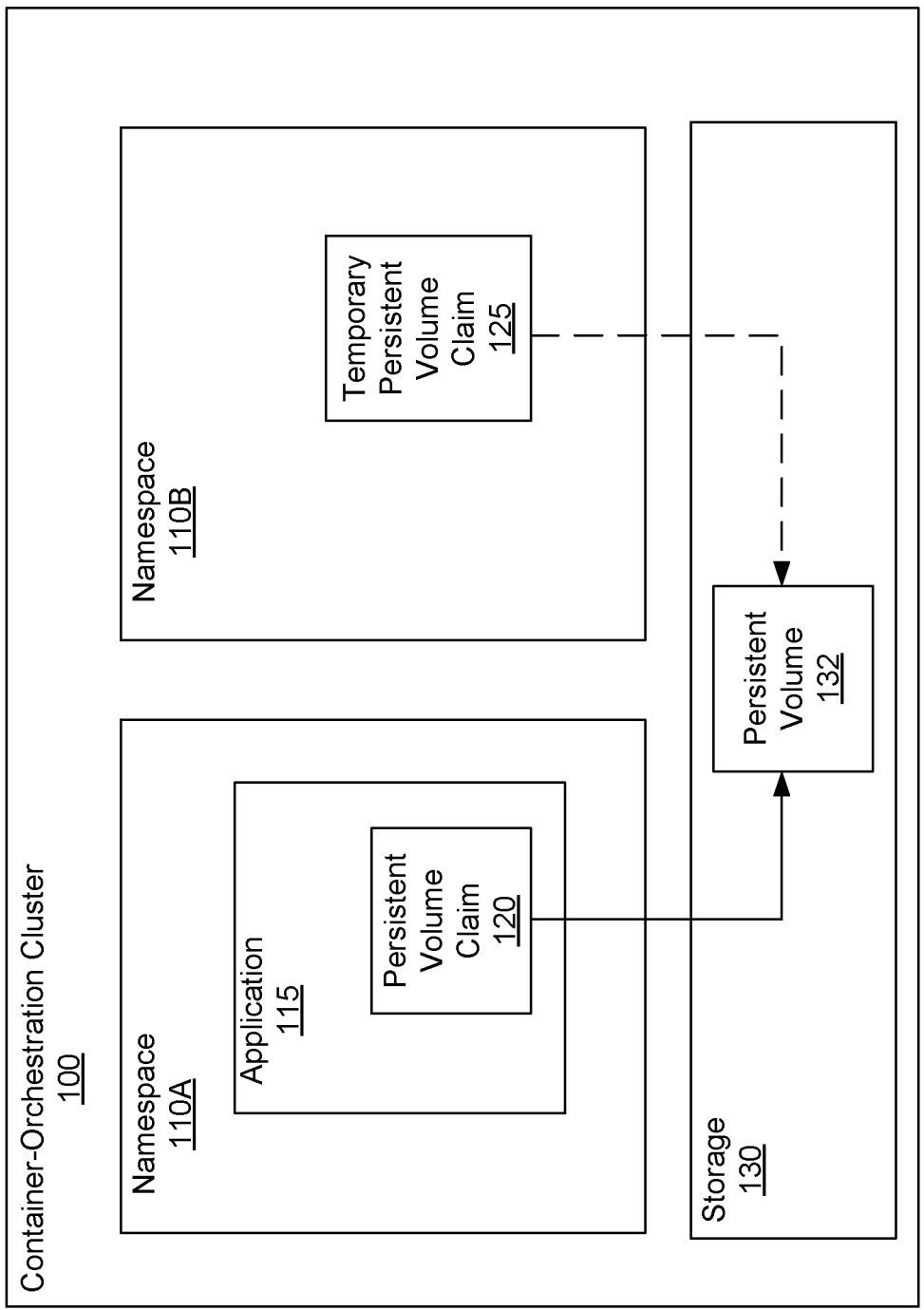
FIG. 1 is a system diagram that illustrates an example computing cluster for pre-population of persistent volumes, in accordance with some embodiments.

When allocating storage in a virtual container cluster (e.g., Kubernetes™ cluster), the storage volumes are generally allocated empty. Conventional systems may populate the empty volumes in a manner that is visible to a requesting application and that interacts with the application to populate the volume with the appropriate data. For example, the application requesting the storage may communicate with a process for populating the empty volume, such as to provide a data source and to participate in synchronization of the data. However, in some instances it may be preferred to allocate a storage volume, in a manner transparent to the application, such that the data is available to the application at startup. For example, when an application is restored from backup after previous operation, the application may expect certain data upon startup. In another example, virtual machine workloads in the containerized environments may expect a virtual disk to be initialized on an associated storage volume to be a source for the virtual machine to boot from. Therefore, conventional virtual containerized environments may not provide sufficient support for local virtual machine boot, application restore from backup in a proper state, or any other instance in which pre-populated volumes may be necessary.

Aspects of the disclosure address the above-noted and other deficiencies by providing a process for pre-population of persistent storage volumes in a containerized cluster (e.g., Kubernetes™ cluster). A container-orchestration system, such as Kubernetes™, may receive a request to generate a persistent volume claim (PVC) from an application executing in a consumption namespace in which applications are executed. The container-orchestration system may then generate a user PVC for the application. The user PVC may include a data source from which the user PVC is to be populated. The container-orchestration system may generate another namespace, herein referred to as a population namespace, that is separate from the consumption namespace. The container-orchestration system may then generate a temporary PVC in the consumption namespace that corresponds to the user PVC but is not visible by the application. The container-orchestration system may then populate a physical storage volume associated with the temporary PVC using the data source identified by the user PVC. Once the physical storage volume associated with the temporary PVC is populated, the container-orchestration system may transfer the populated physical volume from the temporary PVC to the user PVC (e.g., via a namespace transfer).

By providing pre-population of storage volumes in a process that is transparent to the requesting application, a container-orchestration system may support restore from backup of stateful applications and local booting of virtual machines. Additionally, scheduling of processes within the container-orchestration system may be more efficient because applications may be scheduled once the physical volume is populated and provided to the user PVC.

FIG. 1 is a block diagram illustrating a container-orchestration cluster 100 for pre-population of a storage volume. The container-orchestration cluster 100 may be a Kubernetes™ cluster or other virtualization or containerized cluster. Container-orchestration cluster 100 may include one or more namespaces 110A-B. A namespace may be an allocation of specific hardware and/or software resources for executing one or more applications associated with a user (e.g., a sandbox environment). An application 115A-B may execute within a namespace 110A-B. The application 115 may include any type of web applications, server applications, or any other software stored on a network connected server. Additionally, application 115 may be a virtual machine or any other virtualized execution environment. An application may include a collection of one or more containerized processes for performing functions and services of the application. Application 115 may include a persistent volume claim 120 that identifies a persistent volume 132 in physical storage 130. The persistent volume claim 120 may be a storage pointer, a handle, or any other data structure associated with a persistent volume 132 in physical storage 130. For example, a persistent volume claim may be a virtual representation of a persistent volume which can be used by an application in a virtualized execution environment (e.g., container-orchestration system) to access the persistent volume in physical storage. Accordingly, application 115 may use the persistent volume claims 120A-B to claim and to access the corresponding persistent volume 132.

In one example, upon initialization of an application 115 within the namespace 110A, processing logic (e.g., the container-orchestration platform 100) may generate persistent volume claim 120 in the application 115 and allocate an empty persistent volume 132 in physical storage 130 for the persistent volume claim 120A. In some examples, however, the application 115A-B may require that the persistent volume 132 be populated before the application 115A-B can execute properly. Accordingly, as described in further detail below with respect to FIG. 2, before assigning the persistent volume 132 to the PVC 120, processing logic may create a new namespace 110B and a temporary PVC 125. The processing logic may then allocate and populate persistent volume 132 using the temporary PVC 125 in the new namespace 110B and then transfer the persistent volume 132 to the PVC 120 of the application 115 in namespace 110A.

Figure 2:
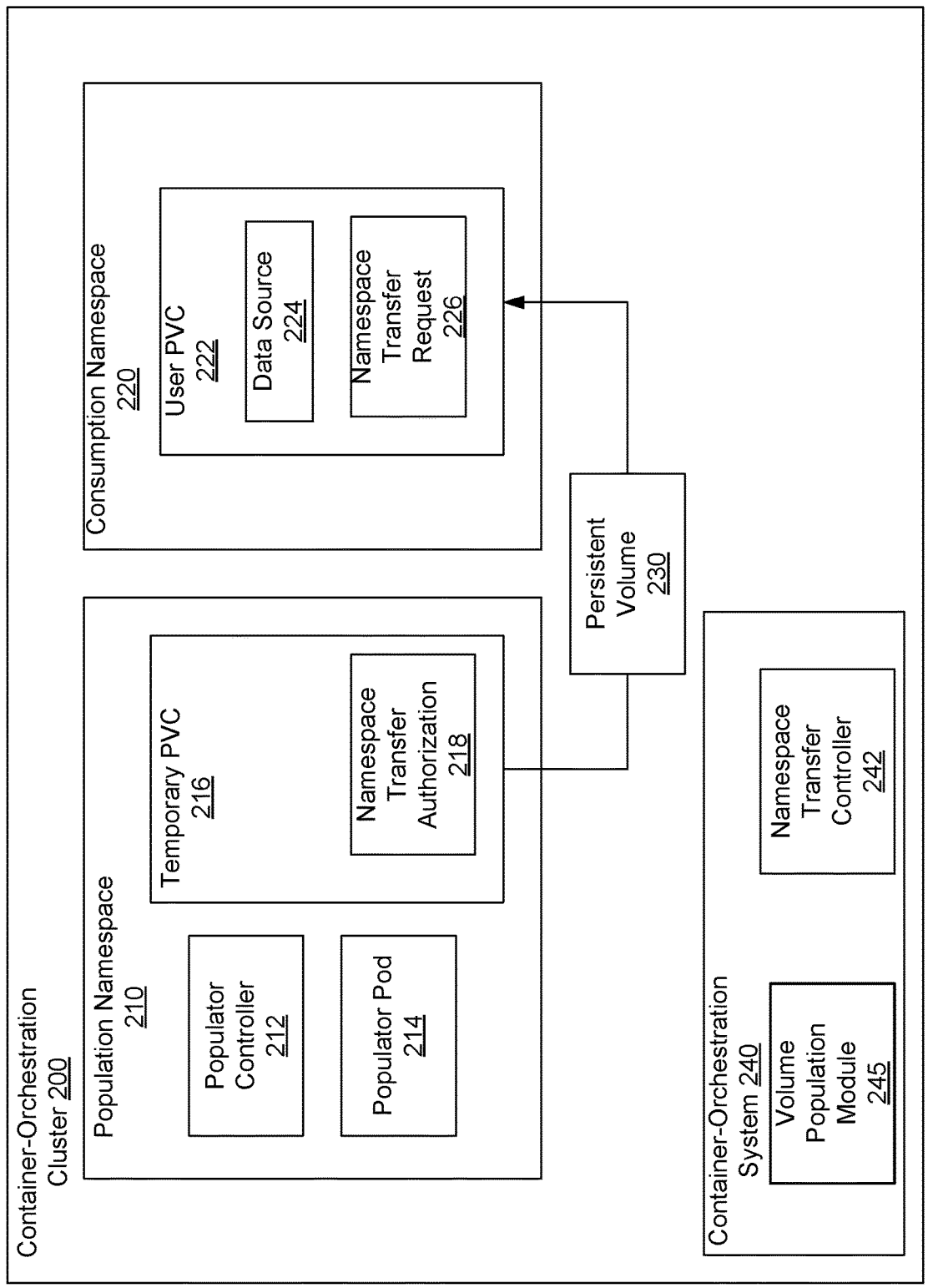
FIG. 2 is a block diagram that illustrates another example of a computing cluster pre-population of persistent volumes in accordance with embodiments of the disclosure.

FIG. 2 is a block diagram that illustrates a container-orchestration cluster 200 for pre-population of persistent storage volumes according to some embodiments. Container-orchestration cluster 200 may include one or more host computing systems and a container-orchestration system 240 for managing the container-orchestration cluster. For example, container-orchestration system 240 may allocate and manage physical computing resources to execute pods including one or more containers of services for performing a functionality. The container-orchestration system 240 may manage an arbitrary number of pods and workloads within the container-orchestration cluster 200. Container-orchestration cluster 200 may include one or more namespaces (e.g., population namespace 210 and consumption namespace 220) managed by the container-orchestration system 240. In one example, consumption namespace 220 may be a namespace 220 in which one or more applications (e.g., client applications) execute. An application may include a collection of one or more containerized processes for performing functions and services of the application.

In one example, container-orchestration system 240 may include volume population module 245 to perform pre-population of a persistent storage volume for an application in the consumption namespace 220. For example, upon initialization and startup of an application in the consumption namespace 220, the application may request user PVC 222 be generated. The request may include a data source from which the PVC is to be populated. The container-orchestration system 240 may then generate the user PVC 222 within the consumption namespace 220. The user PVC 222 may include an indication of data source 224 to be used to populate the PVC 222. The indication of the data source 224 may be a database, an http end point, local storage, network or cloud storage, or any other type of persistent storage, memory, etc. The user PVC 222 may also include a namespace transfer request 226. Although depicted as part of the user PVC 222, the namespace transfer request 226 may be a separate object that is associated with the user PVC 222. In one example, the volume population module 245 may create the namespace transfer request 226 on behalf of the requesting application. The user PVC 222 and the requesting application may remain in a pending or waiting state until the namespace transfer request 226 is authorized.

In one example, after generating the user PVC 222, the container-orchestration system 240 may generate a temporary PVC 216 within population namespace 210. Population namespace 210 may be a separate namespace from consumption namespace 220. In one example, the container-orchestration system 240 may generate the population namespace 210 in response to the request by the application for the user PVC 222. In another example, the population namespace 210 is a persistent namespace existing prior to the request for the user PVC 222. The population namespace 210 may include populator controller 212 and populator pod 214. The populator controller 212 may include processing logic to identify a type of data source that the data source 224 includes. For example, the populator controller 212 may determine whether the data source 224 is an http endpoint, a database, a network server, local storage, etc. The populator controller 212 may then instantiate populator pod 214 based on the determined type of the data source 224. The populator pod 214 may include one or more processes for populating the persistent volume 230 associated with the temporary PVC 216 with data from the data source 224. The one or more processes of the populator pod 214 for populating the persistent volume 230 may be specific for the determined type of the data source 224.

In one example, once the populator pod 214 is finished populating the persistent volume 230, the volume populator controller 212 may create a namespace transfer authorization 218 to indicate that the namespace transfer request 226 has been approved from within the population namespace 210. The namespace transfer authorization 218 may be a data object indicating approval of a namespace transfer request. Namespace transfer controller of the container-orchestration system 240 may detect that the namespace transfer authorization 218 has been associated with the temporary PVC 216. The namespace transfer controller 242 may then search the consumption namespace 220 for a user PVC with a namespace transfer request matching the namespace transfer authorization 218. Once the namespace transfer controller 242 identifies the user PVC 222 with the namespace transfer request 226, the namespace transfer controller 242 may transfer the persistent volume 230 from the temporary PVC 216 to the user PVC 222 to be usable by the requesting application. Transferring the persistent volume 230 may include binding the user PVC 222 to the persistent volume 230. For example, the namespace transfer controller 242 may provide the user PVC 222 with a storage pointer of the persistent volume 230 to allow the application access to the persistent volume 230 via the user PVC 222. In one example, once the transfer of the persistent volume 230 to the user PVC 222 is complete, the volume population controller may update a status of the user PVC 222 and the application from a pending state to an active state. The container-orchestration system 240 may then schedule the application to be executed. Although depicted as separate components, populator controller 212 and namespace transfer controller may be included in volume population module 245.

Figure 3:
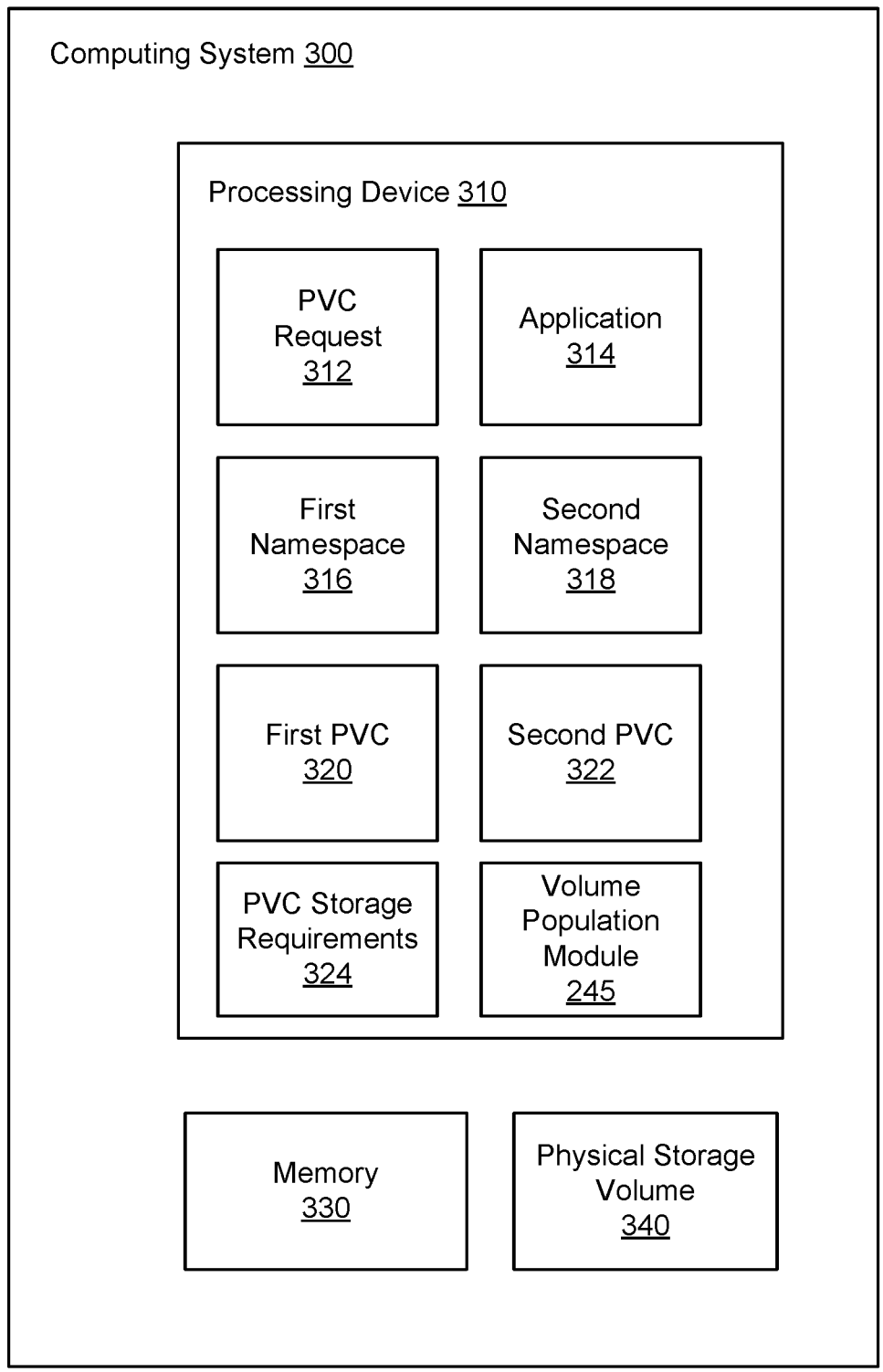
FIG. 3 is a block diagram of an example computing system for pre-population of persistent volumes, in accordance with some embodiments.

FIG. 3 is a block diagram illustrating a computing system 300 for pre-population of persistent storage volumes. Computing system 300 includes processing device 310 and memory 330. Memory 330 may include volatile memory devices (e.g., random access memory (RAM)), non-volatile memory devices (e.g., flash memory) and/or other types of memory devices. Processing device 310 may include a PVC request 312, an application 314, a first namespace 316, a second namespace 318, a first PVC 320, a second PVC, PVC storage requirements, and volume population module 245.

In one example, volume population module 245 may receive a PVC request 313 from application 314 to generate a first PVC 320 within the first namespace 316. The PVC request 313 may include PVC storage requirements 324 that the first PVC 320 is to satisfy. The volume population module 245 may then generate the first PVC 320 in the first namespace and a second PVC 322 in the second namespace 318. The first PVC 320 and the second PVC 322 may both satisfy the PVC storage requirements 324. For example, the second PVC 320 may be congruent with the first PVC 320 (i.e., include the same storage parameters such as size, performance tier, etc.). The volume population module 245 may then populate a physical storage volume 340 corresponding to the second PVC 322. For example, the second PVC 322 may be bound to the physical storage volume 340. In one example, the volume population module 245 may populate the physical storage volume 340 from a data source identified by the first PVC 320. The volume population module 245 may then transfer the populated physical storage volume 340 to the first PVC 320 within the first namespace 316, making the populated data visible to the application 314.

Figure 4:
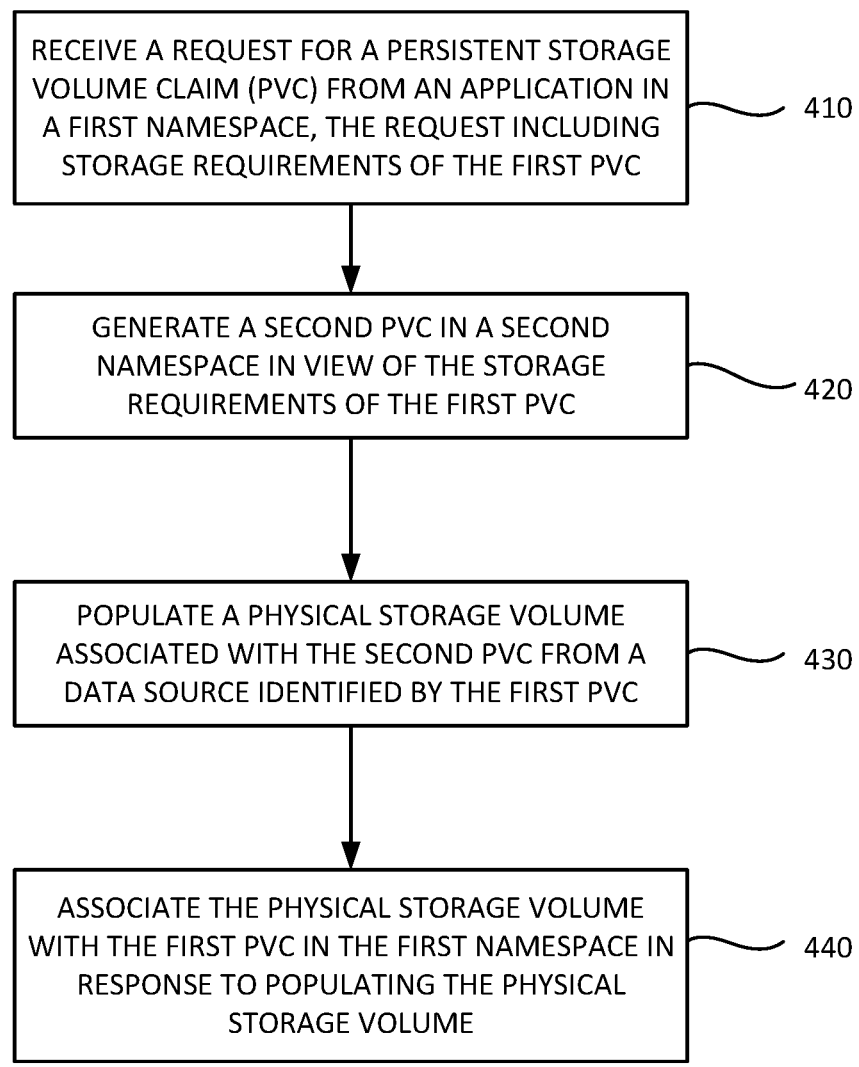
FIG. 4 is a flow diagram of a method of pre-population of persistent volumes in a container-orchestration system in accordance with some embodiments.

FIG. 4 is a flow diagram of a method 400 of virtual machine networking configuration migration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by volume population module 245 of FIG. 2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a request for a first persistent storage volume claims (PVC) from an application in a first namespace, the request including storage requirements of the first PVC. The first namespace may be a sandbox (i.e., allocated set of resource) of a container-orchestration system (e.g., Kubernetes™) in which one or more applications may be executed. In one example, the container-orchestration system may provide an application programming interface (API) for a user or application to provide information, such as storage requirements, a data source, etc. for the first PVC. The processing logic may then generate the first PVC in the first name space with the provided information, a data source, and a namespace transfer request to transfer a persistent storage volume to the first PVC from a different namespace.

At block 420, the processing logic generates a second PVC in a second namespace in view of the storage requirements of the first PVC. The second namespace may be a population namespace. The second namespace may be a temporary namespace generated on the fly when a user or application creates a PVC (e.g., the first PVC) in the user's own namespace. The second PVC may be created within the second namespace with properties that match the storage requirements of the first PVC (e.g., same size, storage class, etc.).

At block 430, the processing logic populates a physical storage volume associated with the second PVC from a data source identified by the first PVC. The data source may be identified by a local object reference to an object in the container-orchestration cluster that describes how the second PVC is to be populated. For example, the data source reference may be an indication that the data is to be downloaded from a particular HTTP endpoint. In one example, the processing logic determines a type of the data source from the data source reference and instantiates a pod with instructions to populate the physical storage volume using the data source. The pod may then populate the physical storage volume. Once the pod populates the physical storage volume, the processing logic may write a namespace transfer authentication to the second PVC indicating that the namespace transfer request in the first PVC is approved.

At block 440, the processing logic associates the physical storage volume with the first PVC in the first namespace in response to populating the physical storage volume. Associating the physical storage volume with the first PVC may include transferring the physical storage volume from the second PVC to the first PVC. For example, the second PVC may initially be bound to the physical storage volume. The processing logic may then bind the first PVC to the physical storage volume and unbind the second PVC from the physical storage volume. The processing logic may then update a status of the PVC to indicate that it is bound and can be used by the application.

Figure 5:
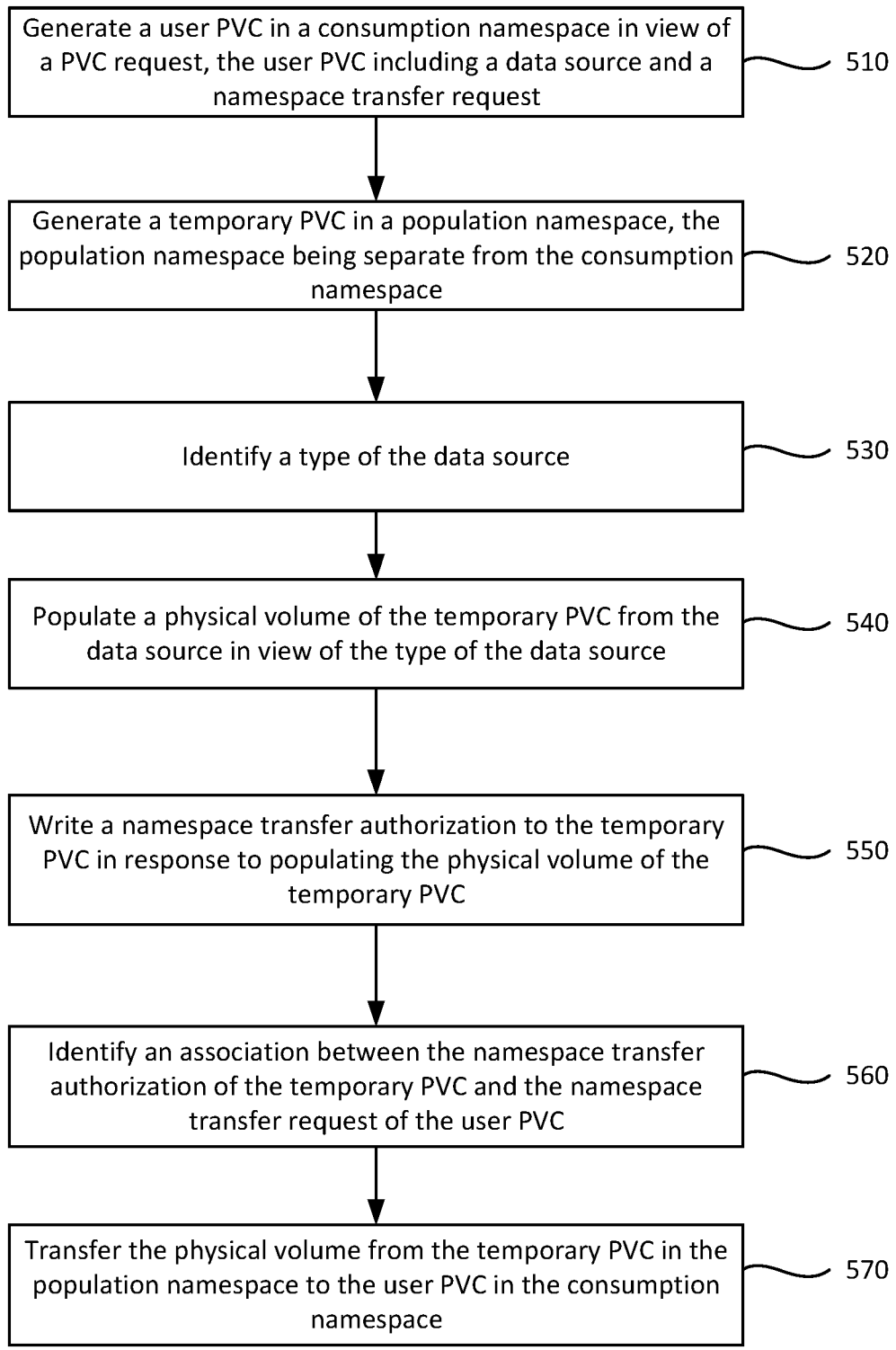
FIG. 5 depicts a flow diagram of another method of pre-population of persistent volumes in a container-orchestration system

FIG. 5 is a flow diagram of a method 500 of virtual machine networking configuration migration, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by volume population module 245 of FIG. 2.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic generates a user PVC in a consumption namespace in view of a PVC request, the user PVC including a data source and a namespace transfer request. In one example, an application in the consumption namespace may generate, or request, the user PVC. The data source may be a reference to a data source. For example, the data source reference may be a reference to a storage source or object and an indication of the data to be retrieved from the data source. The namespace transfer request may be a request for a PVC to be transferred into the consumption namespace from another namespace. For the transfer to be performed, the namespace transfer request must be approved or authenticated (e.g., via an authentication object) from the source namespace of the PVC to be transferred. In one example, after generating the PVC the application may be in a pending state, waiting for the user PVC to be populated and allocated. For example, the user PVC may not be allocated to the application until the namespace transfer request is approved.

At block 520, the processing logic generates a temporary PVC in a population namespace, the population namespace being separate from the consumption namespace. In one example, the processing logic generates the population namespace as a temporary namespace for the temporary PVC. In another example, the population namespace may be a dedicated namespace for populating persistent volumes in a container-orchestration system. The temporary PVC may include the same storage parameters as the user PVC (e.g., amount of storage allocated, storage performance tier, etc.). The processing logic (e.g., an underlying storage driver) may allocate a persistent volume in physical storage based on the storage parameters of the user PVC and bind the temporary PVC to the persistent volume. In another embodiment, the processing logic may generate the temporary PVC in the same consumption namespace and may similarly allocated a persistent volume to the temporary PVC in the consumption namespace. In such an example, the processing logic may provide the temporary PVC with a random name unknown to the application.

At block 530, the processing logic identifies a type of the data source. In one example, the processing logic (e.g., a population controller) may monitor all PVCs in the container-orchestration system and identify the user PVC created by the application. The processing logic may then identify the data source and a type of the data source. Because different types of data sources may require differing methods to populate a persistent volume, the processing logic may identify the appropriate method to populate the temporary PVC based on the type of the data source. At block 540, the processing logic populates a physical volume of the temporary PVC from the data source in view of the type of the data source. In one example, the processing logic may instantiate a pod to populate the persistent volume, the pod including the method of populating the persistent volume in view of the data source type. For example, the processing logic may select one pod from several pods that include different methods, each for populating a persistent volume from a different type of data source.

At block 550, the processing logic writes a namespace transfer authorization to the temporary PVC in response to populating the physical volume of the temporary PVC. For example, if populating the storage volume is successful the processing logic may indicate such by writing the namespace transfer authorization to the temporary PVC. The namespace transfer authorization may indicate that the temporary PVC (i.e., the persistent volume the temporary PVC is bound to) is ready to be transferred to the user PVC. In one example, if the temporary PVC is created in the same consumption namespace as the application, the namespace transfer request and authorization may instead be replaced with a same namespace transfer of the persistent volume from the temporary PVC to the user PVC.

At block 560, the processing logic identifies an association between the namespace transfer authorization of the temporary PVC and the namespace transfer request of the user PVC. In one example, the processing logic (e.g., a namespace transfer controller) may determine that the namespace transfer request of the user PVC is a match for the namespace transfer authorization of the temporary PVC. For example, to determine that the request and the authorization match, the processing logic may determine that they each refer to the same PVC in the population namespace (i.e., the source namespace) and the consumption namespace (i.e., the destination namespace).

At block 570, the processing logic transfers the physical volume from the temporary PVC in the population namespace to the user PVC in the consumption namespace. For example, the processing logic may then perform the namespace transfer of the persistent volume pointed to by the temporary PVC and associate it with the user PVC in the consumption namespace. The processing logic may then update the status of the application from pending to bound. The processing logic (e.g., a scheduler of the container-orchestration system) may then schedule a pod to be executed. Thus, the application will be able to access the expected data in the persistent volume via the user PVC immediately upon execution of the application.

Figure 6:
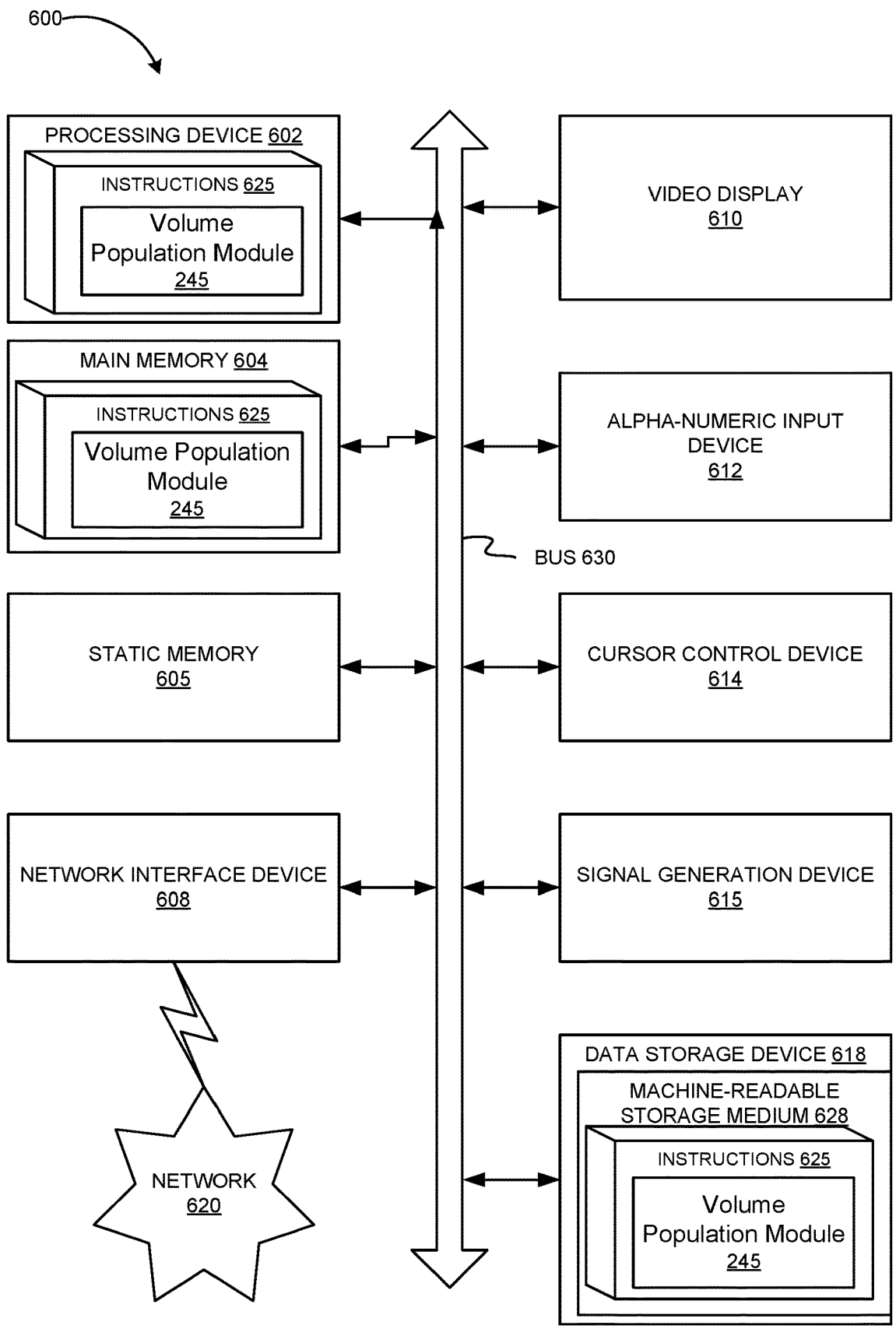
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a volume population module, e.g., volume population module 245 of FIG. 2, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   populating, by a processing device, a physical storage volume associated with a second persistent volume claim (PVC) from a data source identified by a first PVC; and
   in response to populating the physical storage volume, associating, by the processing device, the physical storage volume with the first PVC.

2. The method of claim 1, further comprising:
   generating, by a populator controller, the second PVC as a temporary PVC with a same size as the first PVC.

3. The method of claim 2, further comprising:
   creating, by the populator controller, a populator pod to populate the physical storage volume from the data source identified by the first PVC.

4. The method of claim 1, wherein the second PVC is populated in a second namespace for populating storage volumes of a container-orchestration system.

5. The method of claim 1, further comprising:
   rebinding the physical storage volume from the second PVC to the first PVC, wherein the first PVC and the second PVC are in a same namespace.

6. The method of claim 1, further comprising:
   in response to associating the physical storage volume with the first PVC, executing an application using the first PVC.

7. The method of claim 1, further comprising:
   identifying population instructions to populate the physical storage volume in view of a type of the data source; and
   executing the population instructions to populate the physical storage volume with data from the data source.

8. A system comprising:
   a memory; and
   a processing device operatively coupled to the memory, the processing device to:
   populate a physical storage volume associated with a second persistent volume claim (PVC) from a data source identified by a first PVC; and
   in response to populating the physical storage volume, associate the physical storage volume with the first PVC.

9. The system of claim 8, wherein the processing device is further to:
   generate, by a populator controller, the second PVC as a temporary PVC with a same size as the first PVC.

10. The system of claim 9, wherein the processing device is further to:
    create, by the populator controller, a populator pod to populate the physical storage volume from the data source identified by the first PVC.

11. The system of claim 8, wherein the second PVC is populated in a second namespace for populating storage volumes of a container-orchestration system.

12. The system of claim 8, wherein the processing device is further to:
    rebind the physical storage volume from the second PVC to the first PVC, wherein the first PVC and the second PVC are in a same namespace.

13. The system of claim 8, wherein the processing device is further to:
    in response to associating the physical storage volume with the first PVC, execute an application using the first PVC.

14. The system of claim 8, wherein the processing device is further to:
    identify population instructions to populate the physical storage volume in view of a type of the data source; and
    execute the population instructions to populate the physical storage volume with data from the data source.

15. A non-transitory computer-readable storage medium including instructions that, when executed by a processing device, cause the processing device to:
    populate a physical storage volume associated with a second persistent volume claim (PVC) from a data source identified by a first PVC; and
    in response to populating the physical storage volume, associate the physical storage volume with the first PVC.

16. The non-transitory computer-readable storage medium of claim 15, wherein the processing device is further to:
    generate, by a populator controller, the second PVC as a temporary PVC with a same size as the first PVC.

17. The non-transitory computer-readable storage medium of claim 16, wherein the processing device is further to:
    create, by the populator controller, a populator pod to populate the physical storage volume from the data source identified by the first PVC.

18. The non-transitory computer-readable storage medium of claim 15, wherein the second PVC is populated in a second namespace for populating storage volumes of a container-orchestration system.

19. The non-transitory computer-readable storage medium of claim 15, wherein the processing device is further to:
    rebind the physical storage volume from the second PVC to the first PVC, wherein the first PVC and the second PVC are in a same namespace.

20. The non-transitory computer-readable storage medium of claim 15, wherein the processing device is further to:
    in response to associating the physical storage volume with the first PVC, execute an application using the first PVC.

* * * * *